United States Patent
Wang et al.

(10) Patent No.: US 11,441,066 B2
(45) Date of Patent: Sep. 13, 2022

(54) POLYMER DISPERSIONS FOR OILFIELD FRICTION REDUCTION

(71) Applicant: SOLVAY USA INC., Princeton, NJ (US)

(72) Inventors: Qing Wang, Spring, TX (US); Genyao Lin, The Woodlands, TX (US); Zhihua Zhang, Singapore (SG); Fulya Sudur Zalluhoglu, The Woodlands, TX (US)

(73) Assignee: SOLVAY USA INC., Princeton, NJ (US)

( * ) Notice: Subject to any disclaimer, the term of this patent is extended or adjusted under 35 U.S.C. 154(b) by 0 days.

(21) Appl. No.: 17/099,955

(22) Filed: Nov. 17, 2020

(65) Prior Publication Data
US 2021/0163816 A1    Jun. 3, 2021

Related U.S. Application Data

(60) Provisional application No. 62/942,308, filed on Dec. 2, 2019.

(51) Int. Cl.
  *C09K 8/60* (2006.01)
  *E21B 43/26* (2006.01)
  *C09K 8/68* (2006.01)

(52) U.S. Cl.
  CPC ............... *C09K 8/604* (2013.01); *C09K 8/68* (2013.01); *E21B 43/26* (2013.01); *C09K 2208/28* (2013.01)

(58) Field of Classification Search
  CPC ....... E21B 43/26; C09K 2208/28; C09K 8/68; C09K 8/24; C09K 8/604; C09K 8/72; C09K 8/74
  See application file for complete search history.

(56) References Cited

U.S. PATENT DOCUMENTS

| | | |
|---|---|---|
| 7,232,793 B1 | 6/2007 | King et al. |
| 9,580,535 B2 | 2/2017 | Wilson et al. |
| 2005/0250652 A1 | 11/2005 | Taylor et al. |
| 2011/0094746 A1 | 4/2011 | Allison et al. |
| 2019/0085110 A1 | 3/2019 | Destarac et al. |

FOREIGN PATENT DOCUMENTS

| | | |
|---|---|---|
| WO | 96/30421 A1 | 10/1996 |
| WO | 98/01478 A1 | 1/1998 |
| WO | 98/58974 A1 | 12/1998 |
| WO | 99/35178 A1 | 7/1999 |
| WO | 2020/073286 A1 | 4/2020 |

OTHER PUBLICATIONS

International Search Report issued in International Application No. PCT/JP2020/060833, dated Mar. 12, 2021 5 pages).
Written Opinion issued in International Application No. PCT/JP2020/060833, dated Mar. 12, 2021 (5 pages).

*Primary Examiner* — Zakiya W Bates
(74) *Attorney, Agent, or Firm* — Osha Bergman Watanabe & Burton LLP

(57) ABSTRACT

A polymer dispersion includes a water-soluble copolymer prepared by controlled radical polymerization; a water soluble salt; a polyol; a salt selected from the group consisting of sodium citrate, sodium phosphate, sodium nitrate, and combinations thereof; and water. Methods for using the polymer dispersion for oilfield friction reduction occur under a variety of adverse conditions including low temperatures, salt, scale, and iron.

9 Claims, No Drawings

POLYMER DISPERSIONS FOR OILFIELD FRICTION REDUCTION

CROSS-REFERENCE TO RELATED APPLICATION

The present application claims the benefit of priority under 35 U.S.C. § 119(e) of U.S. Provisional Application Ser. No. 62/942,308, filed on Dec. 2, 2019, the entire disclosure of which is incorporated herein by reference.

FIELD OF INVENTION

The present disclosure relates to compositions and methods for expanding the use of polymer dispersions for oilfield friction reduction under adverse operating conditions.

BACKGROUND ART

Viscous gelled fracturing fluids are commonly utilized in the hydraulic fracturing of subterranean zones (e.g., an oil or gas bearing strata) penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone.

An example of a stimulation operation utilizing an aqueous treatment fluid is hydraulic fracturing. In some instances, a fracturing treatment involves pumping an aqueous treatment fluid (known as a pad fluid) into a subterranean formation faster than the fluid can escape into the formation so that the pressure in the formation rises and the formation breaks, creating or enhancing one or more fractures, thereby forming conductive channels through which fluids may flow to the well bore when the hydraulic pressure is released.

During the pumping of the aqueous treatment fluid into the well bore, a considerable amount of energy may be lost due to friction between the aqueous treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymer dispersions have heretofore been included in aqueous treatment fluids. The friction reducing polymer should reduce the frictional losses due to friction between the aqueous treatment fluid in turbulent flow and the tubular goods and/or the formation.

Polymer dispersions used in hydraulic fracturing processes are subjected to extreme operating conditions. For example, the rising cost of freshwater means lower quality water is more frequently combined with the polymer dispersions. Such water contains many impurities that are difficult or expensive to remove and can adversely impact performance of the polymer dispersions. For example, inorganic ions having a valence state of two or more can interfere with the chemistry of forming or breaking certain types of viscous fluids that are commonly used in hydraulic fracturing processes.

Additionally, hydraulic fracturing is conducted in many regions under very low temperature conditions, which also challenge a composition's usability and effectiveness. There is a need to provide a polymer dispersion which is usable and has good stability under a variety of conditions and is easy to prepare. There is a need to provide a polymer dispersion which can provide excellent friction reducing capacity.

SUMMARY OF INVENTION

The present invention provides a polymer dispersion having expanded uses under a variety of adverse conditions. In an embodiment, the polymer dispersion exhibits scale and/or iron resistant properties. Polymer gelation and separation are avoided in the presence of divalent salts and/or iron. Additionally, the pour point of the polymer dispersion is improved, which allows the composition to be stored and used at lower temperatures.

In one aspect, the present invention relates to a process for preparing a copolymer via controlled living polymerization. The process typically comprises two steps. In a first step (A), an ionic charged polymeric dispersant, either anionic, cationic or amphoteric, is prepared from at least an ionic (either anionic, cationic or amphoteric) monomer in the presence of a radical polymerization control agent. The resulting ionic polymeric dispersant is a living polymer which may be copolymerized with additional monomers when added. In a second step (B), said living polymer is charged into an aqueous solution comprising a nonionic monomer, and optionally an ionic monomer, the mixture is then subject to continuous polymerization. The resulting copolymer of this second step is a copolymer which comprises a block of the ionic charged polymeric dispersant at one terminal of the copolymer and a block of the monomers that are added in the second step. The copolymer obtained is a single polymer since the living polymer obtained in the first step reacts and forms covalent bond with subsequently loaded monomers and becomes part of the polymeric chain in the copolymer obtained at the second step.

In another aspect, the present invention provides a polymer dispersion comprising:
a) 2 to 30 weight percentage of a water soluble copolymer;
b) 10 to 50 weight percentage of a water soluble salt;
c) 0 to 20 weight percentage of a polyol;
d) a salt selected from the group consisting of sodium citrate, sodium phosphate, sodium nitrate, and combinations thereof; and
e) water;
weight percentages are based on total weight of the polymer dispersion;
wherein said copolymer is obtained by the above mentioned process.

The present invention also provides a polymer dispersion comprising:
a) 2 to 30 weight percentage of a water soluble copolymer;
b) 10 to 50 weight percentage of a water soluble salt;
c) 0 to 20 weight percentage of a polyol;
d) a salt selected from the group consisting of sodium citrate, sodium phosphate, sodium nitrate, and combinations thereof; and
e) water;
weight percentages are based on total weight of the polymer dispersion;
wherein said copolymer comprises (i) a block of an ionic charged polymeric dispersant at one terminal; and (ii) a block of a nonionic monomer, optionally containing an ionic monomer.

In some embodiments, said ionic charged polymeric dispersant is an anionic charged polymeric dispersant prepared from at least an anionic monomer according to general formula (II):

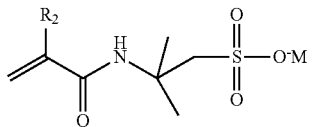

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl.

In some embodiments, said nonionic monomer is according to general formula (III):

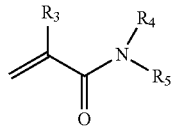

wherein:

$R_3$ is a hydrogen or a $C_1$ to $C_5$ alkyl or hydroxyalkyl, preferably, $R_2$ is hydrogen or methyl;

$R_4$ and $R_5$, independently, is a hydrogen or a $C_1$ to $C_5$ alkyl or hydroxyalkyl, preferably, $R_3$ and $R_4$, independently, is hydrogen or methyl.

In some embodiments, said copolymer comprises:

(i) a block of an anionic charged polymeric dispersant prepared from at least an anionic monomer according to general formula (II):

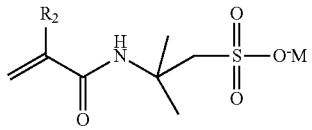

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl;

and (ii) a block of a nonionic monomer, optionally containing an ionic monomer; wherein said nonionic monomer is according to general formula (III):

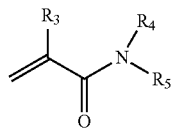

wherein:

$R_3$ is a hydrogen or a $C_1$ to $C_5$ alkyl or hydroxyalkyl, preferably, $R_2$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

The polymer dispersion described herein can be used for various applications, in particular as a friction reducer in oil and gas processes. Accordingly, in another aspect of the present invention, there is provided a method for reducing friction resulting from turbulent flow in an aqueous fracturing fluid in an oil field fracturing process comprising adding to the aqueous fracturing fluid an effective friction-reducing amount of the polymer dispersion described herein. It has been found that the inventive polymer dispersion provides excellent friction reducing capacity and good stability.

The present invention also provides a method for fracturing a subterranean formation that includes the step of injecting an aqueous fracturing fluid comprising the polymer dispersion of the present disclosure into at least a portion of the subterranean formation at pressures sufficient to fracture the formation.

DETAILED DESCRIPTION

Throughout the description, including the claims, the term "comprising one" or "comprising a" should be understood as being synonymous with the term "comprising at least one", unless otherwise specified, and "between" should be understood as being inclusive of the limits.

It should be noted that in specifying any range of concentration, weight ratio or amount, any particular upper concentration, weight ratio or amount can be associated with any particular lower concentration, weight ratio or amount.

As used herein, the term "alkyl" means a saturated hydrocarbon radical, which may be straight, branched or cyclic, such as, methyl, ethyl, n-propyl, iso-propyl, n-butyl, sec-butyl, t-butyl, pentyl, n-hexyl, cyclohexyl.

As used herein, the term "hydroxyalkyl" means an alkyl radical, which is substituted with a hydroxyl groups, such as hydroxymethyl, hydroxyethyl, hydroxypropyl, and hydroxydecyl.

As used herein, the terminology "$(C_n—C_m)$" in reference to an organic group, wherein n and m are each integers, indicates that the group may contain from n carbon atoms to m carbon atoms per group.

As used herein, the term "ionic monomer" means a monomer possessing an anionic or cationic charge, or a monomer possessing an amphoteric charge. Typical anionic monomers include 2-acrylamido-2-methylpropanesulfonic acid or a salt thereof, (meth)acrylic acid sodium salt and vinyl phosphate. Typical cationic monomers include 2-acryloxyethyl trimethyl ammonium chloride, methacryloxyethyl trimethyl ammonium chloride, and diallyldimethylammonium chloride. Typical amphoteric monomers include betaine group-containing (meth) acrylic ester and betaine group-containing (meth) acrylamide.

As used herein, the term "nonionic monomer" means a monomer without charge, typically such as acrylamide and N,N-dimethylacrylamide.

As used herein, the term "polymeric dispersant" means a hydrophilic polymer soluble and dissolvable in water, which may typically function as a dispersant for following polymerization reactions. The term "polymer dispersion" means a dispersion in which discrete polymer particles containing one or more nonionic and/or ionic monomers are dispersed in aqueous phase.

As used herein, the term "radical polymerization control agent" means a compound that is capable of extending the lifetime of the growing polymer chains in a polymerization reaction and of giving the polymerization a living or controlled nature. This control agent is typically a reversible transfer agent as used in controlled radical polymerizations known under the terminology RAFT or MADIX, which typically use a process of reversible addition-fragmentation transfer, such as those described, for example, in U.S. Pat. No. 9,580,535, PCT international publication nos. WO96/30421, WO 98/01478, WO 99135178, and WO 98/58974.

In one aspect, the present invention relates to a process for preparing a copolymer via controlled living polymerization. The process typically comprises two steps.

First Step

In a first step (A), an ionic charged polymeric dispersant is prepared from at least an ionic monomer in the presence of a radical polymerization control agent. The resulting ionic charged polymeric dispersant is a living polymer which may be copolymerized with additional monomers when added.

The ionic monomer may be anionic, cationic or amphoteric. A nonionic monomer may also be added on top of said ionic monomer, in such case, the resulting ionic charged polymeric dispersant comprises the ionic monomer and the nonionic monomer. It is also appreciated that the ionic monomer used may be a single monomer or a mixture of two or more monomers.

Preferably, the ionic monomer is an anionic monomer and the ionic charged polymeric dispersant is an anionic charged polymeric dispersant.

Water, one or more inorganic salts, one or more organic salts, any polymerization additives such as chelants, pH buffers or chain transfer agents may be added. In addition, further processing, structure modifying and/or stabilizing agents may be added to the mixture.

Radical Polymerization Control Agent

The radical polymerization control agent used in the first step or, where appropriate, in the process of this invention is advantageously a compound bearing a thiocarbonylthio group —S(C═S)—. According to some embodiments, the radical polymerization control agent may bear several thiocarbonylthio groups. It may optionally be a polymer chain bearing such a group. Thus, this radical polymerization control agent may, for example, correspond to general formula (I) below:

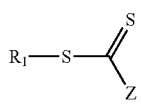
(I)

in which: Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted carboxyl or acyloxyl radical,
an optionally substituted aryloxy radical,
an optionally substituted carbamoyl radical,
a cyano radical,
a dialkyl- or diaryl-phosphonato radical,
a dialkyl-phosphinato or diaryl-phosphinato radical, or
a polymer chain,
and $R_1$ represents:
an optionally substituted alkyl, acyl, aryl, aralkyl, alkene or alkyne group,
a saturated or unsaturated, aromatic, optionally substituted carbocycle or heterocycle, or
a polymer chain, which is preferably hydrophilic or water-dispersible when the agent is used in the first step.

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR'), carboxyl (—COOH), acyloxy (—O$_2$OR'), carbamoyl (—CONR'), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR'), halogen, allyl, epoxy, alkoxy (—OR'), S-alkyl, S-aryl, groups of hydrophilic or ionic nature such as alkali metal salts of carboxylic acids, alkali metal salts of sulfonic acid, polyalkylene oxide chains (PEO, PPO), cationic substituents (quaternary ammonium salts), R' representing an alkyl or aryl group, or a polymer chain.

For the radical polymerization control agent of general formula (I), it is generally preferred for the group $R_1$ to be of hydrophilic nature. Advantageously, it is a water-soluble or water-dispersible polymer chain.

The group $R_1$ may alternatively be amphiphilic, i.e. it may have both hydrophilic and lipophilic nature. It is preferable for $R_1$ not to be hydrophobic.

As regards the radical polymerization control agent of general formula (I), $R_1$ may typically be a substituted or unsubstituted, preferably substituted, alkyl group. It may nevertheless comprise other types of group $R_1$, especially a ring or a polymer chain.

The optionally substituted alkyl, acyl, aryl, aralkyl or alkyne groups generally contain 1 to 20 carbon atoms, preferably 1 to 12 and more preferentially 1 to 9 carbon atoms. They may be linear or branched. They may also be substituted with oxygen atoms, especially in the form of esters or sulfur or nitrogen atoms.

Among the alkyl radicals, mention may be made especially of methyl, ethyl, propyl, butyl, pentyl, isopropyl, tert-butyl, pentyl, hexyl, octyl, decyl or dodecyl radicals.

The alkyne groups are radicals generally containing from 2 to 10 carbon atoms, and contain at least one acetylenic unsaturation, such as the acetylenyl radical.

The acyl group is a radical generally containing from 1 to 20 carbon atoms with a carbonyl group.

Among the aryl radicals, mention may be made especially of the phenyl radical, optionally substituted especially with a nitro or hydroxyl function.

Among the aralkyl radicals, mention may be made especially of the benzyl or phenethyl radical, optionally substituted especially with a nitro or hydroxyl function.

When $R_1$ or Z is a polymer chain, this polymer chain may be derived from a radical or ionic polymerization or derived from a polycondensation.

Preferably, the radical polymerization control agent is a compound which comprises a thiocarbonylthio group —S(C=S)—. Thus, for example, it may be a compound which comprises a xanthate group (bearing —S(C=S)—O— functions), for example a xanthate.

Preferably, the radical polymerization control agent is a compound chosen from xanthates, trithiocarbonates, dithiocarbamates and dithiocarbazates. Especially, xanthates bearing an O-ethyl xanthate function —S(C=S)—OCH$_2$CH$_3$, such as O-ethyl-S-(1-methoxycarbonylethyl) xanthate (CH$_3$CH(CO$_2$CH$_3$))S(C=S)—OEt. Another suitable radical polymerization control agent is dibenzyltrithiocarbonate of formula PhCH$_2$S(C=S)SCH$_2$Ph, in which Ph refers to phenyl.

Anionic Monomer

Examples of the anionic monomer suitable for the present invention include and not limited to: ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, vinylphosphonic acid, α-methylvinyl phosphonic acid, allylphosphonic acid, and 2-acrylamido-2-methylpropanesulfonic acid (AMPS) or a salt thereof.

According to every one of the invention embodiments, the anionic monomer is preferably according to general formula (II):

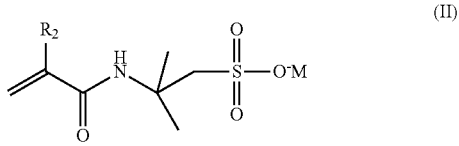

wherein:

$R_2$ is a hydrogen or a $C_1$ to $C_5$ alkyl or hydroxyalkyl, preferably, $R_2$ is hydrogen or methyl;

M is hydrogen, an alkali metal ion such as Na$^+$, K$^+$ and Ca$^{2+}$, or NH$_4^+$, or NR$_4^+$ wherein R is a $C_1$ to $C_5$ alkyl or hydroxyalkyl.

In a preferred embodiment, 2-acrylamido-2-methylpropanesulfonic acid or a salt thereof, or its combination with vinylsulfonic acid and a salt thereof, styrene sulfonic acid and a salt thereof, is used.

Cationic Monomer

Examples of the cationic monomers suitable for the present invention include and not limited to: dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl methacrylamide methyl sulfate quaternary salt, methacrylamidopropyltrimethylammonium chloride, dimethylaminopropyl methacrylamide sulfuric acid salt, diethylaminoethylacrylate, diethylaminoethylmethacrylate and diallyldialkylammonium halides such as diallyldiethylammonium chloride and diallyldimethyl ammonium chloride. In a preferred embodiment, 2-acryloxyethyl trimethyl ammonium chloride, methacryloxyethyl trimethyl ammonium chloride, dimethyl diallyl ammonium chloride, acrylamidopropyl trimethyl ammonium chloride, methacrylamidopropyl trimethyl ammonium chloride was used solely or in combinations thereof.

Amphoteric Monomer

Examples of the amphoteric monomer suitable for the invention include and not limited to: betaine type, for instance, betaine group-containing (meth) acrylic ester, betaine group-containing (meth) acrylamide; sulfobetaine type, for instance sulfopropyl dimethylammonium propyl acrylamide, sulfopropyl dimethylammonium propyl methacrylamide (SPP), sulfohydroxypropyldimethylammoniumpropylmethacrylamido (SHPP), 2-vinyl(3-sulfopropyl)pyridinium betaine, 4-vinyl(3-sulfopropyl)pyridinium betaine, 1-vinyl-3-(3-sulfopropyl) imidazolium betaine, or sulfopropylmethyldiallylammoniumbetaine.

Nonionic Monomer

Examples of the nonionic monomer suitable for the invention include and not limited to: any water soluble monomer having neither anionic or cationc charge such as acrylamide, methacrylamide, N-methyl(meth)acrylamide, N-ethyl(meth)acrylamide, N-propyl(meth)acrylamide, N,N-dimethyl(meth) acrylamide, N,N-diethylacrylamide, N-vinylformamide, N-vinyl-N-methyl formamide, N-vinylacetamide, N-vinyl-N-methylacetamide, N-vinyl-N-ethylacetamide, N-vinyipropionamide, N-vinyl-N-methylpropionamide and N-vinylbutyramide, but not limited to other kinds of nonionic monomers, for example N-vinylformamide, N-vinyl-N-methylformamide, N-vinylacetamide, N-vinyl-N-methylacetamide, N-vinyl-N-ethylacetamide, N-vinylpyrrolidone, N-vinylpiperidone; N-vinyipropionamide, N-vinyl-N-methylpropionamide and N-vinylbutyramide.

According to every one of the invention embodiments, the nonionic monomer is preferably according to the general formula (III):

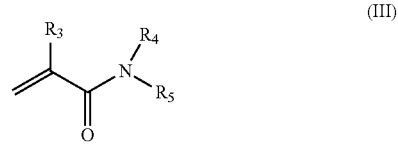

wherein:

$R_3$ is a hydrogen or a $C_1$ to $C_5$ alkyl or hydroxyalkyl, preferably, $R_3$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

The living polymeric dispersant obtained in the first step is then subject to the second step of the process.

Second Step

In the second step (B), the living polymeric dispersant from the first step is charged into an aqueous solution comprising at least a nonionic monomer, optionally with an ionic monomer, followed by continuous polymerization to obtain a copolymer which comprises (i) a block of the ionic polymeric dispersant, notably that formed in the first step; and (ii) a block of nonionic monomer, notably formed by the monomers added in the second step.

Examples of the nonionic monomer suitable for the second step of the process include and not limited to: any water soluble monomer having neither anionic or cationc charge such as acrylamide, methacrylamide, N-methyl (meth)acrylamide, N-ethyl(meth)acrylamide, N-propyl (meth)acrylamide, N,N-dimethyl(meth) acrylamide, N,N-diethylacrylamide, N-vinylformamide, N-vinyl-N-methyl formamide, N-vinylacetamide, N-vinyl-N-methylacetamide, N-vinyl-N-ethylacetamide, N-vinyipropionamide, N-vinyl-N-methylpropionamide and N-vinylbutyramide, but not limited to other kinds of nonionic monomers, for example N-vinylformamide, N-vinyl-N-methylformamide, N-vinylacetamide, N-vinyl-N-methylacetamide, N-vinyl-N-ethylacetamide, N-vinylpyrrolidone, N-vinylpiperidone; N-vinyipropionamide, N-vinyl-N-methylpropionamide and N-vinylbutyramide.

According to every one of the invention embodiments, the nonionic monomer used in the second step is preferably according to the general formula (III):

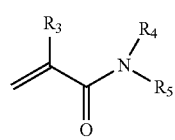

wherein:

$R_3$ is a hydrogen or a $C_1$ to $C_5$ alkyl or hydroxyalkyl, preferably, $R_3$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

An ionic monomer may also be loaded in the second step, on top of the nonionic monomer. The ionic monomer may be selected from those cationic, anionic and amphoteric monomers described above.

The copolymer obtained in the second step is a single polymer since the living ionic charged polymeric dispersant reacts and forms covalent bond with subsequently loaded monomers, and becomes part of the copolymer chain.

The copolymer preferably has an average molecular weight of 750,000 to 10,000,000 Daltons, more preferably 1,000,000 to 5,000,000 Daltons, even more preferably from 2,500,000 to 5,000,000 Daltons.

Initiators for Radical Generation

An initiator for radical generation is also used in the process. Numerous free radical forming compounds may be used as the water-soluble initiator utilized as catalysts for the polymerization reactions. Typical compounds used as catalysts may be those that form free radicals via thermal decomposition, referred to in the art as "thermal initiators" or combinations of compounds that fond free radicals via oxidation/reduction reactions. Such catalysts are combinations of an oxidizing agent and a reducing agent and are commonly referred to in the art as "redox initiators". Either thermal or redox catalysts may be used for the present invention.

Typical catalysts utilized as the thermal initiators include, for example, persulfates, specifically potassium persulfate, sodium persulfate, ammonium persulfate, 2,2'-Azobis(2-methylpropionamide)dihydrochloride and the like. Typical redox initiators include, for example, combinations of oxidizing agents or initiators such as peroxides, specifically benzoyl peroxide, t-butyl hydroperoxide, lauryl peroxide, hydrogen peroxide, 2,2'-diazobisisobutyronitrile, and the like. Typical reducing agents include sodium bisulfite, sodium formaldehyde sulfoxylate, sodium hydrosulfite, and ascorbic and isoascorbic acid. The water-soluble initiator may be employed in an amount of from 0.1 to 3 weight percent of the total monomer weight, and more preferably from about 0.1 to 1 weight percent of the total monomer charge.

The process of the invention may be conducted using the conditions for MADIX process as known to a skilled person, notably those according to U.S. Pat. No. 9,580,535.

Polymer Dispersion

In another aspect of the invention, there is provided a polymer dispersion comprising a copolymer obtained by the process described herein. The polymer dispersion further comprises a water soluble salt, a salt selected from sodium citrate, sodium phosphate, sodium nitrate, and combinations thereof and optionally a polyol.

Advantageously, the present invention provides a polymer dispersion comprises:
- a) 2 to 30 weight percentage of a water soluble copolymer;
- b) 10 to 50 weight percentage of a water soluble salt;
- c) 0 to 20 weight percentage of a polyol;
- d) a salt selected from the group consisting of sodium citrate, sodium phosphate, sodium nitrate, and combinations thereof; and
- e) water;

weight percentages are based on total weight of the polymer dispersion;

wherein said copolymer is obtained by the process described herein.

The present invention also provides a polymer dispersion comprising:
- a) a water soluble copolymer;
- b) a water soluble salt;
- c) optionally a polyol;
- d) a salt selected from the group consisting of sodium citrate, sodium phosphate, sodium nitrate, and combinations thereof; and
- e) water;

weight percentages are based on total weight of the polymer dispersion;

wherein said copolymer comprises (i) a block of an ionic charged polymeric dispersant at one terminal; and (ii) a block of a nonionic monomer, optionally containing an ionic monomer.

Advantageously, the polymer dispersion comprises:
- a) 2 to 30 weight percentage of a water soluble copolymer;
- b) 10 to 50 weight percentage of a water soluble salt;
- c) 0 to 20 weight percentage of a polyol;
- d) a salt selected from the group consisting of sodium citrate, sodium phosphate, sodium nitrate, and combinations thereof; and
- e) water;

weight percentages are based on total weight of the polymer dispersion;

wherein said copolymer comprises (i) a block of an ionic charged polymeric dispersant at one terminal; and (ii) a block of a nonionic monomer, optionally containing an ionic monomer.

Said ionic charged polymeric dispersant may also comprises a nonionic monomer, where a nonionic monomer is added in the first step of the process described herein.

The copolymer preferably comprises from 10% to 80% of the block (i) and from 20% to 90% of the block (ii), more preferably from 10% to 40% of the block (i) and from 40% to 90% of the block (ii), even more preferably, from 15% to 25% of the block (i) and from 70% to 85% of the block (ii).

The component (a) may preferably be present in an amount of 5 to 30% more preferably from 15 to 25%.

The component (b) may preferably be present in an amount of 10 to 30% more preferably from 20 to 30%.

In some embodiments, the component (c) is present in an amount of 1 to 15%. In some embodiments, the component (c) is absent in the polymer dispersion.

In a preferred embodiment, said polymer dispersion comprises a water soluble copolymer which comprises (i) a block of an ionic charged polymeric dispersant at one terminal; and (ii) a block of a nonionic monomer, optionally containing an ionic monomer;

wherein said ionic charged polymeric dispersant is an anionic charged polymeric dispersant prepared from at least an anionic monomer according to general formula (II):

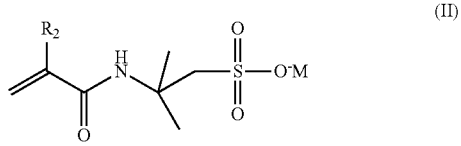

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl;

and/or said nonionic monomer is according to general formula (III):

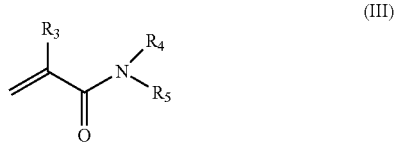

wherein:

$R_3$ is a hydrogen or a $C_1$ to $C_5$ alkyl or hydroxyalkyl, preferably, $R_3$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

Water Soluble Salt

The water soluble salts suitable for the invention include and not limited to: ammonium sulfate, ammonium chloride, potassium chloride, calcium chloride, sodium bromide, calcium bromide, sodium sulfate, magnesium sulfate, aluminum sulfate, sodium nitrate, magnesium nitrate, potassium nitrate, and combinations thereof, and it is not limited to alkali metal and alkaline earth metal acetate, benzoate and formate.

Polyol

Polyols suitable for the invention include and not limited to: dialcohols, polyhydric alcohols, monosaccharides and disaccharides. Preferred polyols include propylene glycol, isoprene glycol, 1,3-butanediol, dipropylene glycol, glycerol, diglycerol, triglycerol, polyglycerol, trimethylolpropane, erythritol, pentaerythritol, sorbitan, sorbitol, glucose, maltitol, saccharose, trehalose, polyethylene glycol.

Preferred polyols may be selected from ethylene glycol, glycerol, propylene glycol, and pentaerythritol.

Other additives or components which are known to those skilled in the art may also use in accordance with the present invention. These include chain transfer agents, which are used to control molecular weight, additives to adjust pH, and compounds utilized as protective colloids which provide additional stability to the polymer particles.

The polymer dispersion is notably an aqueous emulsion, in particular a water-in-water emulsion, wherein the copolymer is dispersed in aqueous phase in the emulsion.

The polymer dispersion described herein is particular useful as a friction reducer. Accordingly, the present invention provides a method for reducing friction resulting from turbulent flow in an aqueous fracturing fluid in an oil field fracturing process comprising adding to the aqueous fracturing fluid an effective friction-reducing amount of the polymer dispersion described herein.

In particular, there is provided a method for reducing friction resulting from turbulent flow in an aqueous fracturing fluid in an oil field fracturing process comprising adding to the aqueous fracturing fluid an effective friction-reducing amount of a polymer dispersion, wherein said polymer dispersion comprises:

a) 2 to 30 weight percentage of a water soluble copolymer;
b) 10 to 50 weight percentage of a water soluble salt;
c) 0 to 20 weight percentage of a polyol;
d) a salt selected from the group consisting of sodium citrate, sodium phosphate, sodium nitrate, and combinations thereof; and
e) water;

weight percentages are based on total weight of the polymer dispersion;

wherein said copolymer comprises (i) a block of an ionic charged polymeric dispersant at one terminal; and (ii) a block of a nonionic monomer, optionally containing an ionic monomer.

In another embodiment, there is provided a method for fracturing a subterranean formation, the method comprising the step of injecting an aqueous fracturing fluid comprising the polymer dispersion described herein into at least a portion of the subterranean formation at pressures sufficient to fracture the formation.

In an embodiment, the salt is selected from the group consisting of sodium citrate, sodium phosphate, and combinations thereof and the aqueous fracturing fluid comprises iron ion dissolved in the fluid. In an embodiment, iron ion includes any combination of ferric (iron (III)) and ferrous (iron (II)) ions.

In another embodiment, the salt is selected from the group consisting of sodium citrate, sodium phosphate, and combinations thereof and the aqueous fracturing fluid comprises one or more divalent cations dissolved in the fluid.

In yet another embodiment, the salt is selected from the group consisting of sodium nitrate, potassium formate, ammonium chloride, and combinations thereof and comprises a polyol.

In another embodiment, there is provided a method for fracturing a subterranean formation, the method comprising the step of injecting an aqueous fracturing fluid comprising a polymer dispersion, wherein said polymer dispersion comprises:

a) 2 to 30 weight percentage of a water soluble copolymer;

b) 10 to 50 weight percentage of a water soluble salt;

c) 0 to 20 weight percentage of a polyol;

d) a salt selected from the group consisting of sodium citrate, sodium phosphate, sodium nitrate, and combinations thereof; and e) water;

weight percentages are based on total weight of the polymer dispersion; wherein said copolymer comprises (i) a block of an ionic charged polymeric dispersant at one terminal; and (ii) a block of a nonionic monomer, optionally containing an ionic monomer, into at least a portion of the subterranean formation at pressures sufficient to fracture the formation.

Preferably, said ionic charged polymeric dispersant is an anionic charged polymeric dispersant prepared from at least an anionic monomer according to general formula (II):

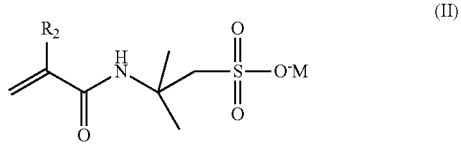

(II)

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl.

Preferably, said ionic charged polymeric dispersant is an anionic charged polymeric dispersant prepared from at least an anionic monomer according to general formula (II):

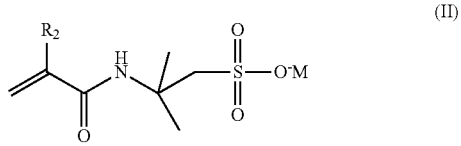

(II)

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl;

and/or said nonionic monomer is according to general formula (III):

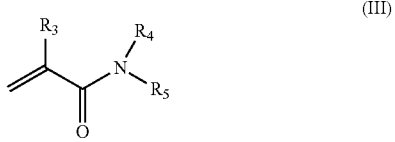

(III)

wherein:

$R_3$ is a hydrogen or a $C_1$ to $C_5$ alkyl or hydroxyalkyl, preferably, $R_3$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

When used as friction reducer, the polymer dispersion described herein may be added to an aqueous fracturing fluid to reduce the friction resulting from turbulent flow in the aqueous fracturing fluid in an oil field fracturing process where the fracturing fluid is pumped at high velocity into a subterranean formation. Typical velocities for fracturing fluids, which generally are pumped through a 2-5 inch pipe, range from about 5 to about 80 or more feet per second and most commonly are about 10 feet per second.

The aqueous fracturing fluids may include fresh water, sea water, brines containing divalent cations, including calcium, magnesium and barium, and/or polyvalent cations, including sodium chloride, potassium chloride, ammonium chloride and calcium chloride, salt water, produced water, recycled water, industrial waste water, waste water associated with oil production, acidic fracturing fluids, and combinations thereof.

Various additives may be added to the fracturing fluid to change the physical properties of the fluid or to serve a certain beneficial function. Generally a propping agent such as sand or other hard material is added which serves to keep the fractures open after the fracturing operation. Also, fluid loss agents may be added to partially seal off the more porous sections of the formation so that the fracturing occurs in the less porous strata. Viscosifying agents may also be added so that the propping agent may be dispersed within the fluid during injection and more easily carried.

Other oilfield additives that may also be added to the fracturing fluid include emulsion breakers, antifoams, scale inhibitors, $H_2S$ and $O_2$ scavengers, biocides, surface tension reducers, shale and clay stabilizers, paraffin/asphaltene inhibitors and corrosion inhibitors.

The composition of the fracturing fluid may be adjusted depending on the particular well or formation to be fractured. For example, in fracturing certain formations it may be desirable to use a high concentration of the propping agent, while in other formations, little or no propping agent may be used.

In general, the polymer dispersion is added to the fracturing fluid, preferably continuously, in an amount of from about 100 to about 2500 ppm, preferably from about from 200 to 2000 ppm and more preferably from about 500 to about 1000 ppm based on the aqueous fracturing fluid.

The polymer dispersion is preferably applied on site by a blender metering product into the fracturing fluid. The polymer dispersion may be added by simply pouring from the container into the fluid stream or very accurately by using a positive displacement pump tied to a feedback from the flowmeter on the blender.

Example 1 Preparation of Ionic Polymeric Dispersant

Polymeric dispersant was prepared in accordance with the following procedure: 250.03 g of 2-acrylamide-2-methyl propane sulfonate sodium salt (50 wt %), 0.05 g of Rhodixan® A1 (radical polymerization control agent according to the invention, from Solvay), and 250.11 g of deionized water were charged into a 1-litre reactor equipped with mechanical stirrer, the mixture was agitated under 200 rpm for 30 mins to form a homogenous solution. The solution was sparged with 800 cc/min of nitrogen gas for 40 mins and then was heated to 35° C. followed by addition of 0.5 g of 5 wt % aqueous solution of sodium persulfate (SPS) and 1.3 g of 5 wt % aqueous solution of sodium formaldehyde sulfoxylate (NaFS). After every one hour, same amount of SPS and NaFS were added. After 3 hours, the formed viscous solution was heated to 45-50° C., and 0.5 g of 10 wt % solution of 2,2'-Azobis(2-methylpropionamide)dihydrochloride was added. After aging for 1 hour, the mixture was cooled down to room temperature and the polymeric dispersant solution was recovered.

Example 2 Preparation of Polymer Dispersion 71.66 g of ammonium sulphate, 12.58 g of sodium sulphate, 0.05 g of EDTA and 213.2 g of deionized were charged into a 1-litre resin reactor and stirred for 15 mins. Subsequently, 95.12 g of acrylamide (50 wt %), 8.6 g of glycerol, 53.09 g of 2-acrylamide-2-methyl propane sulfonate sodium (50 wt %) and 44.6 g of the polymeric dispersant prepared in Example 1 were added and agitated to form a homogenous solution. The solution was sparged with 800 cc/min of nitrogen gas for 40 mins and then was heated to 40° C. followed by addition of 0.75 g of 10 wt % aqueous solution of 2,2'-Azobis(2-methylpropionamide)dihydrochloride. After every 30 mins, same amount of 2,2'-Azobis (2-methylpropionamide) dihydrochloride was added. During the polymerization process, the entire mixture became milky. After 3 hours, 3 g of 10 wt % solution of 2,2'-Azobis (2-methyl propionamide)dihydrochloride was added and aged for 1 hour. The final polymer dispersion was obtained and tested for friction reducing performance.

Example 3 Preparation of Polymer Dispersion 71.65 g of ammonium sulphate, 12.61 g of sodium sulphate, 0.05 g of EDTA and 213.0 g of deionized were charged into a 1-litre resin reactor and stirred for 15 mins. Subsequently, 118.45 g of acrylamide (50 wt %), 4.3 g of glycerol, 29.59 g of 2-acrylamide-2-methyl propane sulfonate sodium (50 wt %) and 44.63 g of the polymeric dispersant prepared in Example 1 were added and agitated to form a homogenous solution. The solution was sparged with 800 cc/min of nitrogen gas for 40 mins and then was heated to 40° C. followed by addition of 0.75 g of 10 wt % aqueous solution of 2,2'-Azobis(2-methylpropionamide)dihydrochloride. After every 30 mins, same amount of 2,2'-Azobis (2-methylpropionamide) dihydrochloride was added. During the polymerization process, the entire mixture became milky. After 3 hours, 3 g of 10 wt % solution of 2,2'-Azobis (2-methylpropionamide)dihydrochloride was added and aged for 1 hour. The final polymer dispersion was obtained.

Example 4 Preparation of Polymer Dispersion 286.72 g of ammonium sulphate, 50.45 g of sodium sulphate, 0.2 g of EDTA and 816.1 g of deionized were charged into a 2.5-litre resin reactor and stirred for 15 mins. Subsequently, 380.4 g of acrylamide (50 wt %), 31.98 g of glycerol, 212.41 g of 2-acrylamide-2-methyl propane sulfonate sodium (50 wt %) and 213.42 g of the polymeric dispersant prepared in Example 1 were added and agitated to form a homogenous solution. The solution was sparged with 800 cc/min of nitrogen gas for 40 mins and then was heated to 45-50° C. followed by addition of 3 g of 10 wt % aqueous solution of 2,2'-Azobis(2-methylpropionamide)dihydrochloride. After every 30 mins, same amount of 2,2'-Azobis (2-methylpropionamide) dihydrochloride was added. During the polymerization process, the entire mixture became milky. After 3 hours, 12 g of 10 wt % solution of 2,2'-Azobis (2-methyl propionamide) dihydrochloride was added and aged for 1 hour. The final polymer dispersion was obtained.

Example 5 Preparation of Polymer Dispersion (Reduced Concentration+Brine)

100 g of a polymer dispersion prepared according to Example 4 was agitated. Separately, a 100 g brine solution containing 12.5% ammonium sulphate and 12.5% sodium citrate salts was prepared. The brine solution was added slowly into the polymer dispersion while mixing for 30 minutes. The final lower concentration polymer dispersion was obtained.

Example 6 Preparation of Polymer Dispersion (Reduced Concentration+Brine)

Pour point temperatures were tested by both LAWLER DR-2H and PSL SYSTEMTECHNIK PPT 45150. In LAWLER DR-2H, the temperature was reduced by 3° C. for every 30 minutes. In PSL SYSTEMTECHNIK PPT 45150, the pour point testing followed ASTM 20 method. Pour point of the polymer dispersion was tested with and without addition of a brine solution. 100 g of a polymer dispersion prepared according to Example 4 was agitated. Separately, a 100 g brine solution containing 30% ammonium sulphate; 10% sodium citrate salts; and 15% glycerol was prepared. For the brine-containing sample, the brine solution was added slowly into the polymer dispersion while mixing for 30 minutes. Pour point with the brine solution was −23° C. In comparison, pour point in the absence of the brine solution was −16° C. Pour point temperature with brine solution was significantly decreased.

Example 7 Scale Resistance Test

Scale resistance test can be performed by injecting the polymer dispersion into a scale resistance test brine and visually observing the precipitation. In order to do the test, 100,000 ppm scale resistance test brine containing 70.2 g NaCl, 4.3 g $MgCl_2$, and 25.5 g $CaCl_2$ was prepared to make 1 liter solution. During the scale resistance test, 1 gpt (0.1% V/V) of polymer dispersion from example 5 was injected into the test brine while mixing, and no scale formation was observed. As a control, scale formation was observed for the polymer dispersion from Example 4 under the same testing conditions.

Example 8 Iron Resistance Test

Iron resistance test was performed by injecting 1 gpt (0.1% V/V) polymer dispersion from Example 5 into 1 Liter DI water. pH of the solution was decreased to 2.5 using an acid solution. Then, 100 ppm Fe (III) was added to the polymer solution. The pH was increased back to neutral using a basic solution and visually observed for any type of precipitation. Almost no precipitation was observed with Example 5. As a control, some precipitation was observed for the polymer dispersion from Example 4 under the same testing conditions.

Example 9 Friction Reduction Tests

Friction reduction efficiency of the polymer dispersion was determined by using flow loop tester designed to measure the pressure drop during the recirculation process. Prior to the test, opened the water in valve above the reservoir bucket and rinse out the bucket. Next, filled the reservoir bucket with water and started the pump to allow the water to circulate and rinse the flow loop for 5 mins. After 5 mins, turned off the pump and closed the water in valve. Wiped the inside of the reservoir.

For each test, filled the reservoir with 4 gallons of the desired test water. Started the pump. The pump was set to 24.77 hz. (5 gallons/min) Recorded the initial pressure (Po) when the pressure stabilizes. Inject the sample into the injection port and start the timer. Record the pressure at 10, 20, 30 seconds, 1, 2, and 3 minutes. After 3 minutes, stop the pump and open the waste valve, draining the reservoir.

Two types of test water were used for FR performance evaluation: fresh tap water and 10% of salt water. Temperature was 25° C. Friction reduction efficiency (FR %) is calculated based on the pressure drop after polymer dispersion was introduced vs. the initial water pressure within the pipeline. Typical 1 gpt (0.1% v/v) loading of the polymeric dispersion was used for friction reduction testing. Friction reduction effects of the different polymeric dispersions are shown in Tables 1 and 2.

TABLE 1

FR % of polymer dispersions in tap water

| Time (seconds) | Example 2 | Example 3 | Example 4 |
|---|---|---|---|
| 0 | 0 | 0 | 0 |
| 10 | 68.0 | 67.2 | 66.6 |
| 20 | 68.0 | 67.2 | 66.8 |
| 30 | 67.5 | 67.2 | 66.4 |
| 60 | 67.1 | 67.0 | 65.3 |
| 120 | 66.7 | 66.9 | 64.1 |
| 180 | 67.9 | 66.9 | 66.5 |

TABLE 2

FR % of polymer dispersions in 10% salt water

| Time (seconds) | Example 2 | Example 3 | Example 4 |
|---|---|---|---|
| 0 | 0 | 0 | 0 |
| 10 | 62.6 | 61.4 | 60.3 |
| 20 | 62.7 | 61.6 | 60.7 |
| 30 | 61.9 | 61.2 | 60.0 |
| 60 | 60.3 | 60.1 | 59.9 |
| 120 | 59.5 | 58.8 | 59.2 |
| 180 | 58.7 | 58.5 | 57.8 |

As shown in Tables 1 and 2, the inventive polymer dispersions exhibited fast hydration rate to achieve the maximum FR % and remarkable salt-tolerance. The inventive polymer dispersions demonstrated good friction reducing capacity.

The invention claimed is:

1. A polymer dispersion comprising:
    a) 2 to 30 weight percentage of a water soluble copolymer;
    b) 10 to 50 weight percentage of a water soluble salt;
    c) 0 to 20 weight percentage of a polyol;
    d) a salt selected from the group consisting of sodium citrate, sodium phosphate, sodium nitrate, and combinations thereof; and
    e) water;
    weight percentages are based on total weight of the polymer dispersion; wherein said copolymer is obtained by a process comprising the steps of:
    (A) an ionic charged polymeric dispersant is prepared from at least an ionic monomer in the presence of a radical polymerization control agent to obtain a living polymer,
    (B), said living polymer is charged into an aqueous solution comprising a nonionic monomer, and optionally an ionic monomer, the aqueous solution is then subject to continuous polymerization to obtain said copolymer.

2. The polymer dispersion according to claim 1, wherein said radical polymerization control agent is a compound bearing a thiocarbonylthio group —S(C=S)—.

3. The polymer dispersion according to claim 1, wherein said radical polymerization control agent is a compound chosen from the group consisting of xanthate, trithiocarbonate, dithiocarbamate and dithiocarbazate.

4. A method for reducing friction resulting from turbulent flow in an aqueous fracturing fluid in an oil field fracturing process comprising adding to the aqueous fracturing fluid an effective friction-reducing amount of the polymer dispersion according to claim 1.

5. A method for fracturing a subterranean formation, the method comprising the step of injecting an aqueous fracturing fluid comprising the polymer dispersion of claim 1 into at least a portion of the subterranean formation at pressures sufficient to fracture the formation.

6. The method of claim 5, wherein the fracturing fluid is selected from the group consisting of fresh water, sea water, brines, salt water, produced water, recycled water, industrial waste water, waste water associated with oil production, and combinations thereof.

7. The method of claim 5, wherein the salt is selected from the group consisting of sodium citrate, sodium phosphate, and combinations thereof and the aqueous fracturing fluid comprises iron ion dissolved in the fluid.

8. The method of claim 5, wherein the salt is selected from the group consisting of sodium citrate, sodium phosphate, and combinations thereof and the aqueous fracturing fluid comprises one or more divalent cations dissolved in the fluid.

9. The method of claim 5, wherein the salt is selected from the group consisting of sodium nitrate, potassium formate, ammonium chloride, and combinations thereof and comprises a polyol.

* * * * *